(12) United States Patent
Ramachandran (10) Patent No.: US 7,519,254 B2
(45) Date of Patent: *Apr. 14, 2009

(54) POLARIZATION INSENSITIVE MICROBEND FIBER GRATINGS AND DEVICES USING THE SAME

(75) Inventor: Siddharth Ramachandran, Hoboken, NJ (US)

(73) Assignee: OFS Fitel, LLC

( * ) Notice: Subject to any disclaimer, the term of this patent is extended or adjusted under 35 U.S.C. 154(b) by 0 days.

This patent is subject to a terminal disclaimer.

(21) Appl. No.: 11/643,520

(22) Filed: Dec. 21, 2006

(65) Prior Publication Data

US 2007/0104432 A1   May 10, 2007

Related U.S. Application Data

(63) Continuation of application No. 10/914,208, filed on Aug. 9, 2004, now Pat. No. 7,177,510.

(51) Int. Cl.
*G02B 6/02* (2006.01)
(52) U.S. Cl. .................. 385/123; 385/124; 385/126; 385/127; 385/128
(58) Field of Classification Search .......... 385/123, 385/124, 125, 126, 127, 128, 10, 11, 37
See application file for complete search history.

(56) References Cited

U.S. PATENT DOCUMENTS

| | | | |
|---|---|---|---|
| 4,974,931 A | 12/1990 | Poole | |
| 5,371,815 A | 12/1994 | Poole | |
| 5,937,113 A | 8/1999 | He et al. | |
| 6,282,341 B1 | 8/2001 | Digonnet et al. | |
| 6,430,342 B1 | 8/2002 | Kim et al. | |
| 6,654,533 B1 | 11/2003 | Koteles et al. | |
| 2003/0021510 A1 | 1/2003 | Satorius | |
| 2004/0042714 A1 | 3/2004 | Ramachandran | |
| 2004/0047551 A1 | 3/2004 | Ramachandran | |

*Primary Examiner*—James P Hughes
(74) *Attorney, Agent, or Firm*—Wendy W. Koba (57) ABSTRACT

A microbend-induced fiber grating is formed from a section of optical fiber configured to exhibit "splitting" between the resonant wavelengths supported by the TE and TM components of the $LP_{1m}$ mode and the resonant wavelength supported by the odd/even $HE_{2m}$ components of the $LP_{1m}$ mode. Since only the TE and TM components are polarization dependent, by splitting and shifting the resonant wavelengths for these modes away from a system-desired wavelength(s) supported by the odd/even HE modes, a polarization insensitive microbend-induced fiber grating can be formed. A fiber core configuration including a central core region, trench and ring is formed to exhibit a large radial gradient in core refractive index profile, with a significantly steep transition between the ring index and the trench index, to provide the desired splitting between the (undesired, polarization sensitive) TE/TM modes and the HE mode.

6 Claims, 8 Drawing Sheets

Vector Representation

FIG. 2 (b)

Scalar Representation

POLARIZATION INSENSITIVE MICROBEND FIBER GRATINGS AND DEVICES USING THE SAME

CROSS-REFERENCE TO RELATED APPLICATION

This application is a continuation of U.S. application Ser. No. 10/914,208, filed Aug. 9, 2004 now U.S. Pat. No. 7,177,510 and allowed Oct. 2, 2004.

TECHNICAL FIELD

The present invention relates to microbend fiber gratings and, more particularly, to forming polarization insensitive microbend fiber gratings by intentionally separating the HE and TE/TM vector modes in a uniquely configured fiber such that only the HE modes are present for the resonant wavelength(s) of interest.

BACKGROUND OF THE INVENTION

Tunable broadband mode converters play an important role in wavelength division multiplexed (WDM) optical communication systems. They may be used, for example to dynamically convert a lightwave signal propagating in one mode of a "few mode" fiber into another spatial mode. Such coupling is attractive to alter the path the lightwave signal takes, since the alternate path (defined by the other spatial mode in the fiber) may have preferred dispersion, nonlinearity or amplification properties. An example of this is a higher-order-mode (HOM) dispersion compensator, where light in an entire communication band is switched from an incoming $LP_{01}$ mode to a higher-order mode such as the $LP_{11}$ or $LP_{02}$ mode.

In a general sense, long-period gratings (LPGs) are mode-conversion devices that provide phase-matched coupling to transfer power from one mode of an optical fiber to another. This has proven to be especially useful for coupling between a guided mode and a cladding mode of ordinary transmission fibers so as to create a wavelength-selective loss. In optical communication systems, LPGs have been used extensively for realizing devices that offer wavelength-selective attenuation of a WDM communication signal. Dynamic tuning of the spectral characteristics of LPGs has been proposed and a variety of dynamic tuning techniques have been demonstrated. In particular, LPGs that couple the core mode to a cladding mode can be dynamically tuned by modulating the refractive index of an outer or inner cladding material that interacts with the cladding mode of the fiber. A microbend-induced fiber grating (MIG) is one type of dynamic LPG where the perturbation in refractive index is induced by periodic "microbending" of the fiber. In particular, the coupling strength of a MIG is tunable by changing the strength of a propagating acoustic wave or by changing the pressure applied to the fiber (e.g., pressing the fiber with a corrugated surface of a defined periodicity).

As will be described in detail below, MIGs have several advantageous device applications. For example, when one of the co-propagating modes is the fundamental mode of a single mode fiber and the other is a cladding-guided mode, MIGs yield wavelength-dependent loss spectra when broadband light is transmitted through the single mode fiber. Wavelength-dependent loss is known to be useful for several device effects, such as gain equalization filters, spectral shapers for broadband lightwave devices, amplified spontaneous emission filters, loss filters for stabilizing the operating wavelength of fiber lasers, etc. On the other hand, if both of the co-propagating modes are guided in the core region of a fiber, MIGs can be used to realize efficient mode conversion, as noted above, which has applications such as higher-order mode conversion, variable optical attenuation, etc.

One drawback to the use of MIGs is their inherent polarization sensitivity, even when the grating is induced in a perfectly circular fiber. The mode depictions in FIGS. 1 and 2 can be used to explain this phenomenon. A microbend-induced fiber grating, as noted above, will couple a circularly symmetric and polarization degenerate mode (such as the $LP_{01}$ mode shown in FIGS. 1(a) and (b)) with anti-symmetric $LP_{1m}$ modes (such as the $LP_{11}$ mode of FIGS. 1(a) and (b)), where m defines the radial order of the anti-symmetric mode. Referring to FIG. 2, the $LP_{11}$ mode is shown as possessing a four-fold degeneracy including the vector modes $TE_{01}$, $TM_{01}$ and the odd and even $HE_{21}$ modes. In any fiber waveguide possessing radial index variations (which are necessary to define a core/cladding boundary), these four modes are known to exhibit slightly different propagation constants. Thus, coupling with a microbend fiber grating of a given grating period $\Lambda$ results in exhibiting slightly different resonant wavelengths for each one of the different modes. Since different polarization orientations of the fundamental mode will result in different excitation levels for the four modes, the resulting coupling spectrum will also be polarization dependent—an unwanted result since it severely restricts the applicability of MIGs in fiber optic systems, where a "polarization insensitive" response is often necessary condition.

Prior attempts at reducing the polarization sensitivity of MIGs have generally fallen into three classes: (1) inducing microbends along two orthogonal transverse axes of the fiber, in one case by helically winding thin wires around a fiber to generate circularly symmetric microbends; (2) forming MIGs in extremely thin fibers (results in coupling only to the odd/even HE modes) and (3) introducing polarization diversity into the system, using external components to compensate for polarization-dependent losses. Looking at the first solution, it has been found to be limiting in the sense that it involves the precision machining of expensive and complex corrugated blocks with tight angular tolerances. Additionally, it is necessary to ensure that no polarization rotation occurs as the light traverses from one set of microbends to an orthogonal set of microbends. The use of helical microbends, as also proposed, requires individual assembly for each device (with each device requiring a high level of precision) and cannot provide "strength tuning"—the fundamentally attractive feature of MIGs. The use of extremely thin fibers, as required in the second class of solutions, is not practical for "real world" system applications and can only be used with acousto-optic configurations since the action of pressing a corrugated block against an extremely thin fiber introduces a host of reliability and yield issues. The third class of solutions (polarization diversity) requires the use of a device such as a Faraday rotator mirror to rotate the state of polarization (SOP), in association with a circulator and polarization beam splitter to form a pair of orthogonal signals. Indeed, a pair of essentially identical MIGs would be required, each acting on a separate one of the orthogonal components. This scheme is considered to add substantial loss, as well as cost and size, to the system.

Thus, a need remains in the prior art for a microbend-induced fiber grating that is polarization insensitive and useful in a variety of system applications, providing polarization insensitivity regardless of the configuration used to induce the microbends in the fiber (e.g., acousto-optical fiber, corrugated blocks, permanently etched gratings, etc.).

SUMMARY OF THE INVENTION

The need remaining in the prior art is addressed by the present invention, which relates to microbend fiber gratings and, more particularly, to forming polarization insensitive microbend fiber gratings by intentionally separating the HE and TE/TM vector modes in a uniquely configured fiber such that only the HE modes are present for the resonant wavelength(s) of interest.

The present invention is based on the discovery that a microbend fiber grating can be made inherently polarization insensitive if lightwave coupling is limited to occur only into the HE odd/even modes. Typically, the propagation constants of the $TE_{01}$, $TM_{01}$ modes are slightly different from the propagation constant of the pair of $HE_{21}$ modes (where the odd/even HE modes exhibit an identical propagating constant). The difference in propagation constants is very small, and the corresponding wavelengths of resonance for a uniform microbend induced fiber grating formed in such fibers differ by approximately 0.2 to 5.0 nm for various states of polarization (SOPs) of the input light. While this difference (hereinafter referred to as "wavelength splitting") is relatively small, it is large enough to induce polarization dependent losses of 10 dB or more.

In accordance with the present invention, a fiber is configured to provide the desired wavelength splitting by designing the refractive index profile of the fiber core to exhibit a substantially large radial gradient. In particular, the fiber core is defined as including a central core region, a trench surrounding the central core region and a ring surrounding the trench. Each portion of the core is defined by its refractive index ($\Delta n$) and radius r, the refractive index being defined as a "refractive index difference" with respect to the refractive index of silica (defined as "0"), and the radius thus defining the thickness of the particular region. The following parameters are used as design rules that are simultaneously satisfied to form a fiber that exhibits the desired wavelength splitting of the present invention: (1) the refractive index difference of the ring ($\Delta n_r$) is selected to be greater than 0.015, with a sufficiently "steep" transition (no more than 1 μm) between the refractive index of the trench and the ring; and (2) the refractive index difference of the central core region ($\Delta n_c$) is maintained to be approximately three-quarters the value of the refractive index difference of the ring $\Delta n_r$ (i.e., $\Delta n_c \approx 0.75 * \Delta n_r$).

In one embodiment of the present invention, the fiber may be configured to also exhibit a "turn-around point" (TAP) condition, as discussed in my co-pending application Ser. No. 10/234,289, filed Mar. 4, 2004, where the TAP condition has been found to provide for a relatively large bandwidth of operation, and can therefore yield grating resonances with very large bandwidths.

It is a significant aspect of the present invention that such a wavelength splitting microbend fiber grating may be formed using either the acousto-optic or corrugated element tuning technique (as well as used for fixed wavelength, non-tunable microbend fiber gratings).

Other and further aspects and embodiments of the present invention will become apparent during the course of the following discussion and by reference to the accompanying drawings.

BRIEF DESCRIPTION OF THE DRAWINGS

Referring now to the drawings,

FIGS. 7(a) and (b) contain the relative index plots and phase matching curves for a second embodiment of a polarization insensitive MIG formed in accordance with the present invention;

FIGS. 11(a) and (b) illustrate the utilization of the polarization insensitive MIG as an optical switch; and FIGS. 12(a) and (b) illustrate the utilization of a set of polarization insensitive MIGs of the present invention as mode converters (either static or dynamic mode converters).

DETAILED DESCRIPTION

As will be discussed in detail below, the optical fiber within which a microbend grating is formed is intentionally designed, in accordance with the present invention, such that the propagation constants of the $TE_{0m}$ and $TM_{0m}$ modes are substantially separated from the propagation constant of the odd/even $HE_{2m}$ mode. As a result, the resonant wavelengths associated with the $TE_{0m}$ and $TM_{0m}$ modes will be significantly different/separated from the resonant wavelength of the $HE_{2m}$ mode, where the resonant wavelength of the $HE_{2m}$ mode is then defined as the transmission wavelength for the optical system. For the remainder of the discussion, it will be presumed that radial mode m will be the first order mode, where m=1. It is to be understood, however, that the principles of the present invention are equally applicable to higher order modes.

It has been found that fibers with substantially large radial gradients in their refractive index profiles (i.e., where a significant portion of the power of the $LP_{11}$ mode resides close to regions of the fiber where the refractive index varies rapidly with radial position) lead to the desired large wavelength splitting required for polarization insensitivity. Thus, the present invention is embodied in a number of different fiber configurations that provide this rapid change in radial refractive index.

Figure 1A:
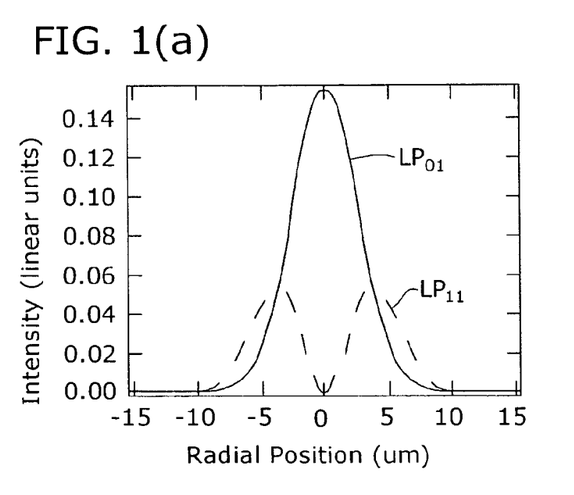
FIGS. 1(a) and (b) illustrate radial plots (FIG. 1(a)) and intensity plots (FIG. 1(b)) for the $LP_{01}$ and $LP_{11}$ modes.
Figure 1B:
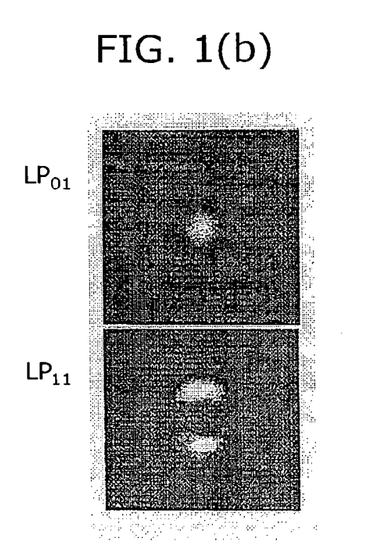
Figure 2:
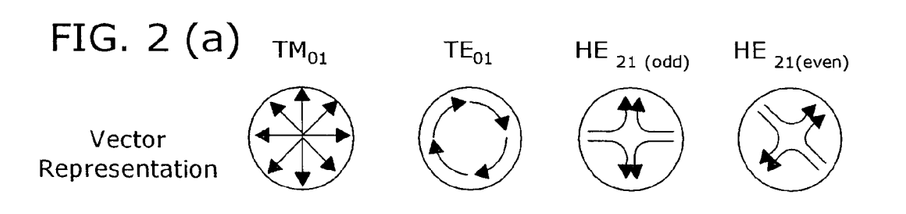
FIG. 2 contains, in FIG. 2(a) the vector presentation of the four modes of the $LP_{11}$ mode, along with the pair of scalar representations in FIG. 2(b)

FIG. 1, as referred to briefly above, illustrates in FIG. 1(a) the radial plots of intensity for the $LP_{01}$ and $LP_{11}$ modes, respectively, in an optical fiber with a core designed to support these two modes. FIG. 1(b) contains the corresponding two-dimensional intensity plots for these same $LP_{01}$ and $LP_{11}$ modes. As is evident from FIG. 1, the $LP_{01}$ mode has a circularly symmetric field profile, while the $LP_{11}$ mode contains a null in its center, and is circularly antisymmetric. This representation of "linearly polarized" (LP) modes in an optical fiber is only approximately correct, since it treats the electric field as a scalar instead of a vector quantity. For example, the propagation constants $\beta_{01}$ of both the parallel and perpendicular polarizations of the $LP_{01}$ mode are identical—thus, the propagation characteristics of the fundamental mode are inherently insensitive to the state of polarization of the signal passing therethrough. However, as mentioned above, it is well known that the $LP_{11}$ modes are actually linear combinations of four distinct vector modes, namely the $TE_{01}$, $TM_{01}$ and the even and odd $HE_{21}$ modes. The vector representations for these four modes are illustrated in FIG. 2(a), along with their linear combinations in FIG. 2(b), resulting in the two types of scalar $LP_{11}$ modes. The arrows of FIG. 2(a) represent the orientation of the electric field. When only the scalar wave equation is considered, these modes have identical propagation constants. However, when the full vectorial wave equation is considered, the four modes have distinct propagation constants. That is, $$\beta_{TE_{01}} \neq \beta_{TM_{01}} \neq \beta_{HE_{21}}, \text{ and } \beta_{HE_{21}}^{even} = \beta_{HE_{21}}^{odd},$$

which shows that while the TE, TM and HE modes have different propagation constants, the even and odd (and thus any rotationally variant version of the) HE modes are degenerate.

The difference in propagation constants for these various modes is relatively small, and can be obtained by first solving the scalar wave equation, which yields the propagation constant for the $LP_{11}$ mode, and then applying the first-order perturbation theory to obtain the first-order vector corrections to this field, as shown below:

$$\beta_{vector} = \beta_{scalar} + \delta\beta_{pert}.$$

This difference has serious implications for the performance of microbend induced fiber gratings (MIGs), leading to the discovery of polarization insensitivity as a result of mode splitting ("wavelength splitting" as a function of mode) in accordance with the present invention. In particular, MIGs couple the fundamental mode with circularly antisymmetric $LP_{11}$ modes, and the resonant wavelength of operation is closely tied to the propagation constants of different modes by the following resonant condition:

$$\lambda_{res} = \Lambda \cdot (n_{01} - n_{1m}), \text{ and } \beta_{01} = \frac{2\pi}{\lambda_{res}} n_{01}; \beta_{1m} = \frac{2\pi}{\lambda_{res}} n_{1m},$$

where $n_{01}$ and $n_{1m}$ are the effective indices of the $LP_{01}$ and $LP_{1m}$ modes, respectively, and are related to the propagation constants (as shown above), and $\Lambda$ is the grating period.

Since each vector component in the $LP_{1m}$ mode group has a slightly different propagation constant, it follows that the resonant wavelengths are also different for each of the modes. Further, the $TE_{0m}$ and $TM_{0m}$ modes are, by definition, polarization sensitive, and are excited by the grating only for certain input states of polarization of the $LP_{01}$ mode. On the other hand, the degenerate $HE_{2m}$ pair has electric field vectors pointing in all directions within the cross-sectional plane of a fiber, and are thus excited by any input state of polarization of the $LP_{01}$ mode. This result implies that the resonance generated by a microbend grating coupling the fundamental mode to an $LP_{1m}$ mode may exhibit three different resonances (i.e., a resonant condition at three different wavelengths), two of which would be strongly polarization dependent.

Figure 3:
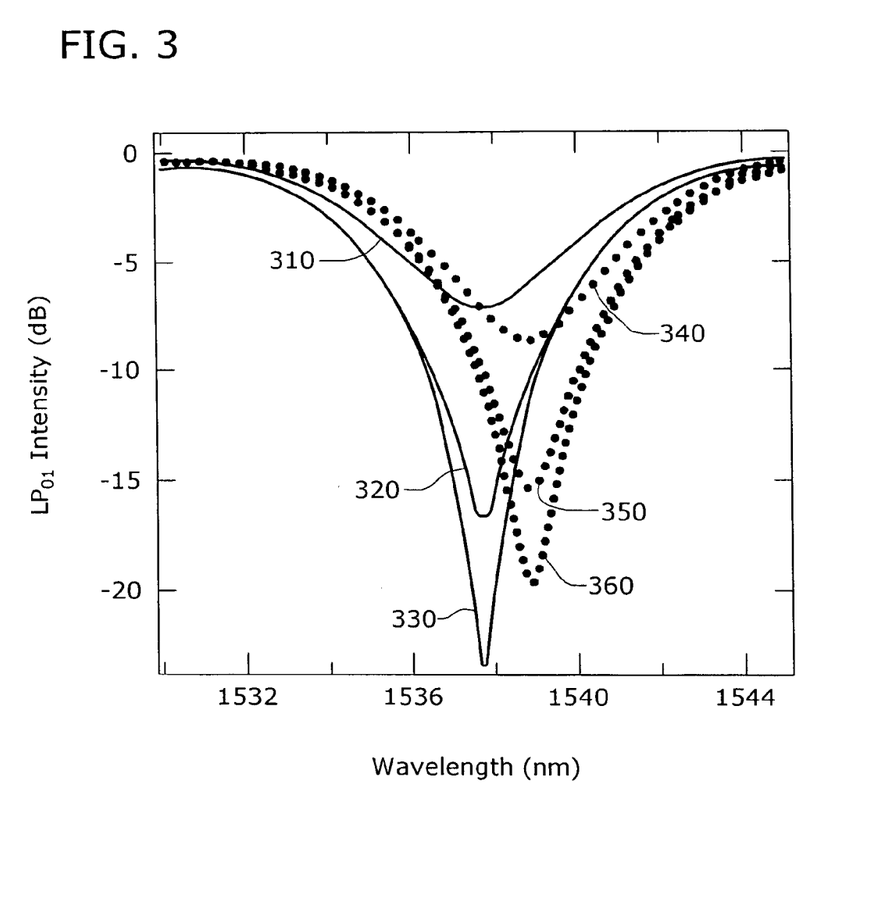
FIG. 3 contains a graph of the spectra (for both parallel and perpendicular polarizations) for a set of three phase matching curves.

In practice, since these three modes have almost identical propagation constants, their resonances merge slightly, yielding two distinct (but highly polarization sensitive) resonances. FIG. 3 illustrates the spectra of microbend grating resonances excited in an exemplary fiber, with a 600 μm grating period designed to couple the fundamental mode with the cladding guided $LP_{13}$ mode, for a variety of strengths and polarization states. The phase matching curves for the $TE_{03}$, $HE_{23}$ and $TM_{03}$ modes are distinct, but similar, for the reasons discussed above, with their resultant spectra shown as curves 310, 320 and 330. The spectra illustrate resonances of increasing strength when the electric field vector of the fundamental mode ($LP_{01}$) is parallel to the plane in which the microbends are induced. Likewise, curves 340, 350 and 360 show resonances of increasing strength when the electric field vector of the fundamental mode is perpendicular to the plane in which the microbends are induced. This difference in resonances between the parallel and perpendicular polarizations clearly shows both the significant advantage (independent, strength-only tuning capability) and the fundamental limitation (inherent polarization sensitivity) of microbend gratings. Note that the polarization-dependent losses (PDL) can be as high as 10 dB for a 20 -dB resonance. This polarization dependence of MIGs may thus be characterized in terms of the spectral separation between resonances. For the given example of MIGs in conventional prior art fibers, the resonances are separated by approximately 1 nm, where this value may vary between as low as 0.3 mm and several nm, depending on the type of fiber used. Regardless of fiber type, however, all of these values of resonance separation lead to unacceptable levels of PDL, and hence this is an inherent problem of all MIGs.

In accordance with the present invention, therefore, a novel class of fiber designs is proposed that enables polarization-independent microbend fiber gratings and is based on the discovery that fibers can be designed to accurately control the difference in propagation constants $\delta\beta_{pert}$, as defined in the above equations, between the different $HE_{2m}$, $TE_{0m}$ and $TM_{0m}$ modes. For any fiber waveguide, the core is defined by:

$$n^2(r) = n_{co}^2 [1 - 2\Delta \cdot f(r)],$$

where $n_{co}$ is defined as the peak index of refraction in the core, r is the radial coordinate defining the distance from the center of the core, $\Delta$ is the "relative index contrast", as defined by the relation $(n_{co} - n_{cl})/n_{co}$, $n_{cl}$ being the refractive index of the cladding, and f(r) is defined as the normalized profile of the refractive index. Additionally, the perturbations to the scalar propagation constant are given by:

$$\delta\beta_{TE_{01}} = 0$$

$$\delta\beta_{TM_{01}} = 2(I_1 + I_2)$$

$$\beta_{HE_{21}}^{even} = \beta_{HE_{21}}^{odd} = (I_1 + I_2),$$

where the quantities $I_1$ and $I_2$ are related to the refractive index profile of a fiber by the following relations:

$$I_1 = \int r \cdot E_{lm}(r) \cdot \frac{\partial E_{lm}(r)}{\partial r} \cdot \frac{\partial f(r)}{\partial r} dr$$

$$I_2 = \int E_{lm}^2(r) \cdot \frac{\partial f(r)}{\partial r} dr,$$

where $E_{1m}(r)$ is defined as the field profile for the mode with indices "l" and "m".

Since the provision of optical coupling with microbend-induced fiber gratings is restricted to antisymmetric modes that comprise polarization dependent components (i.e., the $TE_{0m}$ and $TM_{0m}$ modes) as well as the polarization insensitive $HE_{2m}$ mode, a polarization-insensitive microbend-induced fiber grating of the present invention is thus formed by using a fiber where coupling occurs only to the polarization insensitive component of this triplet, namely, the $HE_{2m}$ mode (at least within the spectral range of interest). Since the spectral range is typically 20 nm or larger, a fiber that is designed to have resonances of the three modes separated by 20 nm or more will lead to polarization-insensitive MIG.

Figure 4:
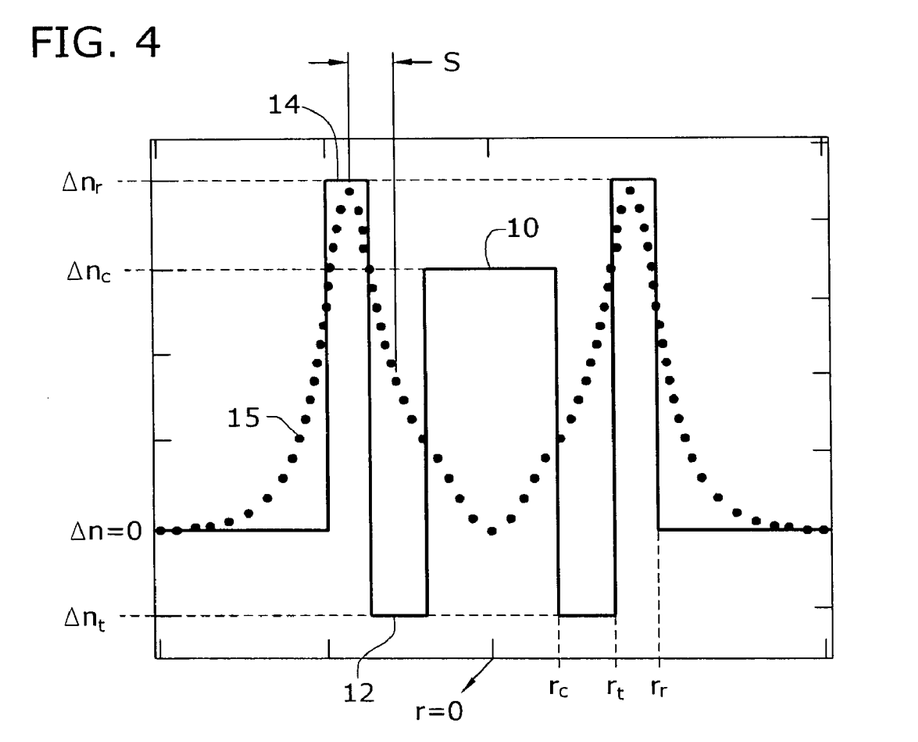
FIG. 4 illustrates, in idealized form, the refractive index profile for a polarization insensitive microbend-induced fiber grating MIG) of the present invention.

FIG. 4 illustrates, in an ideal form, the refractive index profile associate with realizing a "wavelength splitting" fiber that may be used in forming a polarization-insensitive MIG in accordance with the present invention. The idealized fiber index profile, as shown, is defined by a central core region 10 of refractive index $\Delta n_c$ and radius $r_c$, a trench 12 surrounding core region 10 with a refractive index of $\Delta n_t$ and radius $r_t$, and a ring 14 surrounding trench 12, with a refractive index of $\Delta n_r$ and radius $r_r$. The refractive indices are each described in terms of "refractive index difference" from the silica cladding reference value of zero. The design rules for the fiber are governed by the relations discussed above, where it follows that the perturbations, $\delta\beta_{TM\_0m}$, $\delta\beta_{HE\_2m}$, must be maximized to achieve large resonant wavelength separation. The above equations indicate that this maximization is achieved by maximizing the quantities $I_1$ and $I_2$ and these, in turn, are maximized by a fiber design with large (scalar) $LP_{1m}$ modal power close to the waveguide transition regions (such as steep index steps, or any other region where the gradient of the index profile is large).

Referring to FIG. 4 with these characteristics in mind, it is shown that the $LP_{11}$ mode, illustrated by plot 15, has both a large intensity, as well as a large intensity gradient close to the steep index step of high index ring 14. Additionally, a useful device should also exhibit low insertion loss, which requires that the fundamental mode (i.e., the mode used to couple into and out of the device) have a nominally Gaussian shape so as to correspond with like-profiled optical devices at the input and output of the MIG. To satisfy this requirement, core region 10 should be sufficiently large (or high enough in index) so that the fundamental $LP_{01}$ mode resides essentially in central core region 10. Therefore, such an inventive fiber can be defined in terms of refractive index differences and radial values as follows: (1) the refractive index difference $\Delta n_r$ of ring 14 should be greater than 0.015, with a sufficiently steep "inner" index step toward trench 12. The inner index step is defined by the spatial extent S over which the index changes from the value associated with ring 14 to the value associated with trench 12, where S should be no greater than one micron; and (2) the central core region refractive index should be approximately 75% of the value of the ring refractive index, that is, the central core radius and refractive index should be large enough such that the fundamental $LP_{01}$ is essentially completely supported within central core region 10, without being so large that the antisymmetric $LP_{1m}$ will also be guided within central core region 10.

Figure 5:
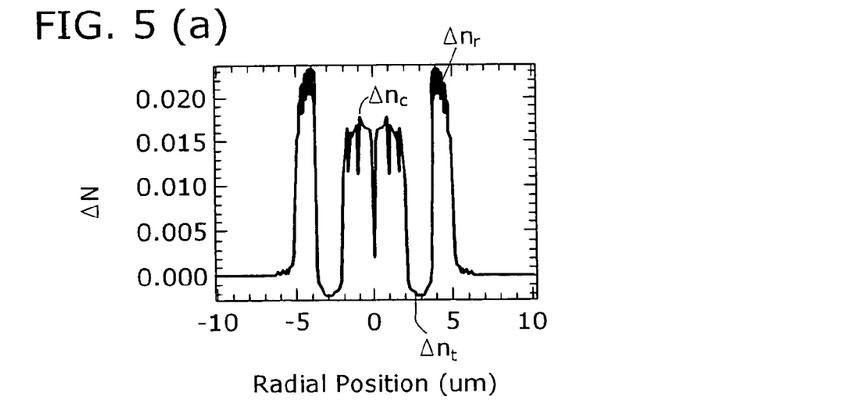
FIGS. 5(a)-(c) illustrate experimentally measured properties of a polarization insensitive MIG of the present invention.

FIGS. 5(a)-(c) illustrate experimentally measured properties of a fiber formed in accordance with the present invention, where FIG. 5(a) shows the measured refractive index profile values for $\Delta n_c$, $\Delta n_t$ and $\Delta n_r$. FIG. 5(b) illustrates the phase matching curves (grating period as a function of wavelength) of the fiber design of FIG. 5(a) for the $TE_{01}$, $HE_{21}$ and $TM_{01}$ modes, where it is obvious that these three curves are vastly separated. The large vector perturbation terms, leading to large differences in propagation constants and hence the phase matching curves of FIG. 5(b), is indeed the design objective of the present invention. FIG. 5(c) illustrates experimentally measured spectra for gratings with periods ranging from 742 μm to 850 μm, as induced in a fiber with the profile of FIG. 5(a). The grating may be induced, for example, by pressing the fiber between a corrugated metal block (with the period of the corrugations defining the grating period) and a rubber pad. Referring to FIG. 5(c), three distinct resonant peaks are evident in each spectrum, with the center peak (associated with the $HE_{21}$ mode) being the strongest. This peak is the strongest since, as discussed above, the HE mode is polarization insensitive. The remaining pair of resonances ($TE_{01}$ and $TM_{01}$) are relatively weak since no more than one-half of the total available signal power will ever exist in a particular polarization. This result thus confirms the polarization sensitivity phenomena in microbend induced fiber gratings. It is to be noted that the wavelength separation between the HE mode and the TE/TM modes is on the order of 60 nm, the relatively large value desired to maintain the polarization insensitivity over the operating range of the device at any given time.

Figure 6:
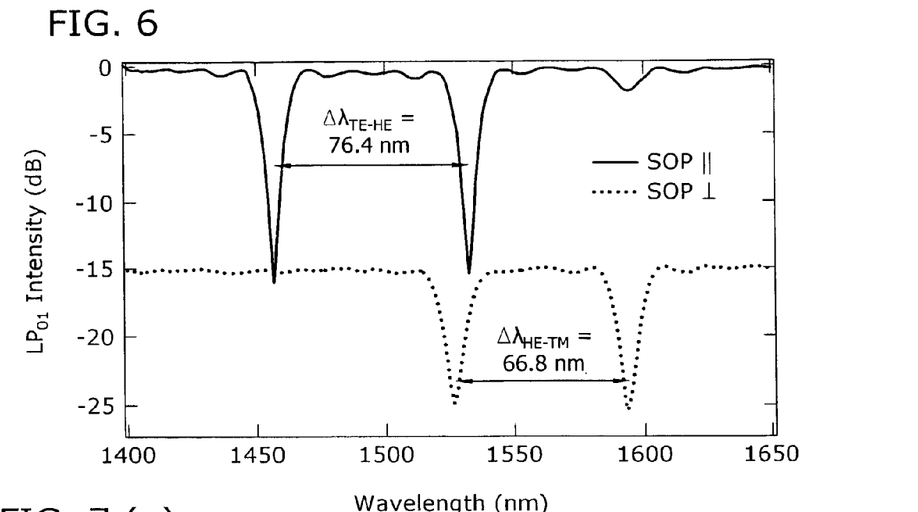
FIG. 6 is a plot of polarization intensities for an exemplary input signal, "forces" to follow the perpendicular and parallel states of polarization.

The significance of the polarization state of the input signal on the presence of the TE and TM modes is evident from the values illustrated in FIG. 6, which contains a plot of transmitted intensity for an input signal controlled to pass through a MIG with a set of parallel polarization states, denoted as "SOP ||" and "SOP ⊥". As shown, where the input state of polarization corresponds to the $TE_{01}$ mode (SOP ||), only the $TE_{01}$ and HE modes are excited, whereas. for light of orthogonal polarization (SOP ⊥) only the HE and $TM_{01}$ resonant peaks will be found. In accordance with the teachings of the present invention, the HE mode, being polarization insensitive, will have a resonant peak under either extreme polarization state. Additionally, FIG. 6 illustrates that the optimized fiber design of the present invention yields significantly large wavelength splitting, on the order of 76 nm between the $TE_{01}$ and HE modes, and on the order of 67 nm between the $TM_{01}$ and HE modes.

Figure 7:
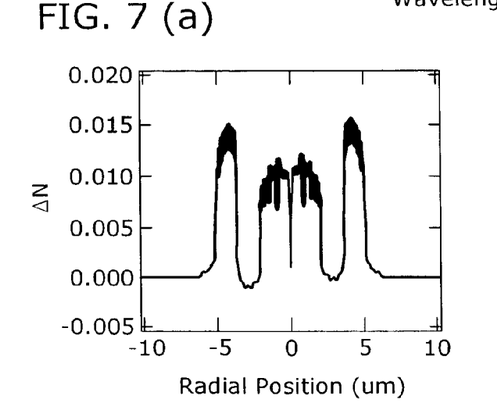

FIGS. 7(a) and (b) contain the relative index plots and phase matching curves for another fiber formed in accordance with the present invention, where the fiber design associated with FIGS. 7(a) and (b) also exhibits a "minima" along each phase curve. As discussed in my above-referenced co-pending application, this minima is defined as a "turn-around point" (TAP). Referring to FIG. 7(b), the grating period for an exemplary polarization insensitive MIG supporting only the odd/even HE modes is illustrated as horizontal line 72, where this particular arrangement has a grating period Λ of approximately 485 μm. It has previously been demonstrated that when the fiber grating period is chosen to couple the phase matching curve at the TAP (the "TAP resonance condition"), large bandwidth mode coupling is achieved. The presence of a TAP is thus indicative of a relatively large bandwidth and spectrally flat resonance over bandwidths as large as 100 nm for the associated microbend-induced fiber grating, characteristics that are often crucial in the design of the fiber grating.

Figure 8:
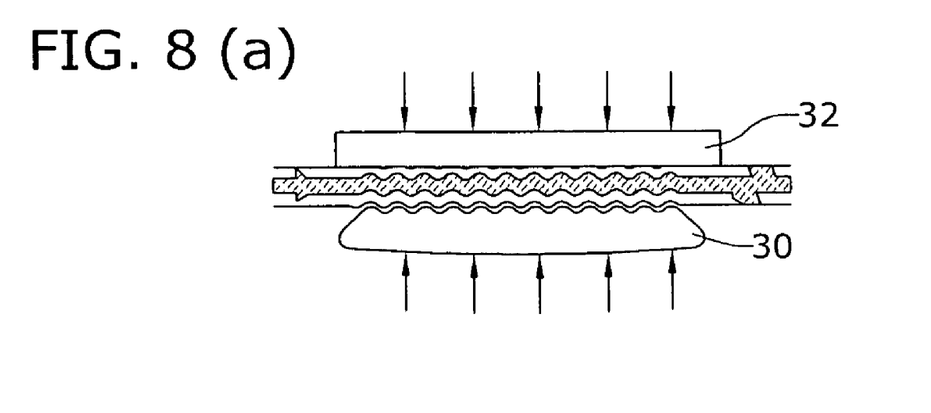
FIGS. 8(a)-(d) illustrate a set of four exemplary techniques for forming/inducing microbends into a fiber formed in accordance with the present invention.

As mentioned above, since the polarization insensitivity of the MIG of the present invention is associated with a proper design of the fiber in terms of refractive index differences and radial dimensions, any appropriate method for inducing microbends can be used to form a grating of the desired period. FIGS. 8(a)-(d) illustrate a set of four exemplary methods of introducing the microbends in the fiber, where FIG. 8(a) illustrates the use of a corrugated plate 30 and a rubber pad 32 (described above) and the grooves within corrugated plate 30 exhibit the periodicity desired to be induced into the fiber. FIG. 8(b) is a variation of this arrangement, in this case using a pair of corrugated blocks 34 and 36 that are aligned such that their teeth fit into each other's grooves, as shown. In this case, as the fiber is pressed between the plates, the microbend grating is induced. Therefore, a lower pressure may be used to form the same pattern as that in the fiber of FIG. 8(a). FIG. 8(c) illustrates an acousto-optic arrangement, where a piezoelectric transducer 38 (connected to an RF power source, not shown) is used to propagate an acoustic wave along the fiber, which in turn results in periodic microbends with a period inversely proportional to the frequency of the RF power source and amplitude directly proportional to the power of the RF source. Thus, both the grating period and amplitude may be adjusted with this acousto-optic arrangement. FIG. 8(d) illustrates an exemplary microbend-induced fiber grating where the perturbations in the fiber have been permanently formed, using any of the well-known techniques of the art, including periodic arcing with a splicer, or periodic ablation with a $CO_2$ laser. The embodiments of FIGS. 8(a)-(d) are meant to be exemplary only, and various other techniques of introducing microbends into a fiber section formed in accordance with the present invention may be used to form a polarization-insensitive microbend-induced fiber grating.

Figure 9:
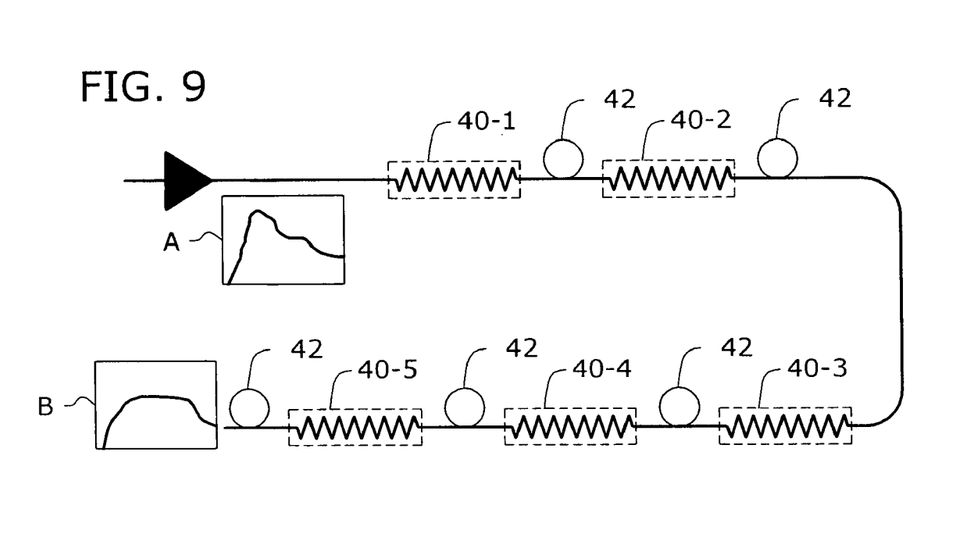
FIG. 9 illustrates a system comprising a cascaded set of polarization insensitive MIGs formed in accordance with the present invention.

There exists a variety of different optical systems and subsystems that may utilize a polarization-insensitive MIG as formed in accordance with the present invention. FIG. 9 illustrates a cascaded arrangement of a plurality of MIGs 40-1 through 40-5, where each separate grating may be either a dynamic (adjustable) or static device. In particular, a cascaded set of such gratings may be used to create a spectrally flat output, particularly when the input is from an erbium-doped fiber amplifier whose gain spectrum is highly wavelength dependent. Using dynamic filters further allows the characteristics of each grating to be tuned in real time to respond to changes in the input signal spectrum. Graph A in FIG. 9 depicts the input signal spectrum, and graph B depicts the output signal spectrum. It is shown that by using a plurality of cascaded MIGs of the present invention, a variety of unwanted features present in an input signal spectrum may be virtually eliminated and the spectrum significantly flattened over a large spectral range. Loops 42 between adjacent MIGs 40 signify mode-stripping action to radiate the $LP_{11}$ mode out of the signal path through each individual MIG 40. This mode stripping can be achieved, for example, by bending the fiber, using in-fiber tapers or splices to single mode fibers.

Figure 10:
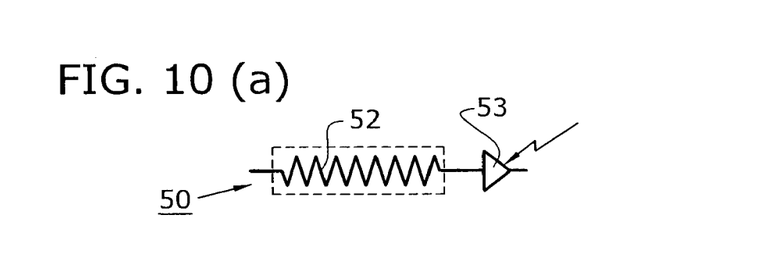
FIGS. 10(a)-(c) illustrate various embodiments for using the polarization insensitive MIG of the present invention as a variable optical attenuator.

FIG. 10(a) illustrates an exemplary variable optical attenuator (VOA) 50 that may be formed in accordance with the present invention by configuring a microbend-induced fiber grating with a TAP condition, as discussed above, to provide an (adjustable) large, spectrally flat attenuation in the grating 52. The positioning of a VOA 50 at the input of an optical receiver 53 allows for cost effective optimizing of the bit error rate at the receiver by controlling the received power. When such a device is used to follow a continuous wave (CW) lightsource 55, as illustrated in FIG. 10(b), it may function as a low cost, low speed data modulator, or used to impart low speed monitoring tones on top of an input signal. A variable optical attenuator formed from a MIG of the present invention may also be used with an optical amplifier 54, as shown in FIG. 10(c), where the attenuator helps to maintain amplifier 54 at a constant saturation level, thus reducing any transient changes in the noise figure or gain spectrum.

Figure 11:
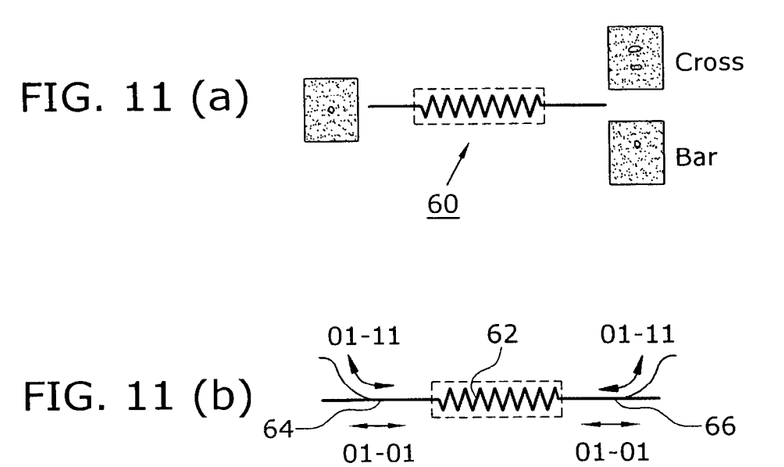

The polarization-insensitive microbend-induced fiber grating of the present invention can also be used as a switch, since it is capable of moving light between two spatial modes in a polarization insensitive fashion. FIG. 11(a) illustrates this application of the present invention, illustrating the operation of one such exemplary switch 60 in the "cross" or "bar" state. Additionally, well-known techniques to couple the $LP_{11}$ mode in a two-mode fiber to the fundamental mode of a separate single mode fiber, through (for example) a fused fiber coupler, may be used in conjunction with a MIG 62 of the present invention to form a four-port 2×2 optical switch in which all of the inputs and outputs are associated with the fundamental mode of the fiber. FIG. 11(b) illustrates this concept, with a pair of fused fiber couplers 64 and 66 disposed on either side of MIG 62.

Figure 12:
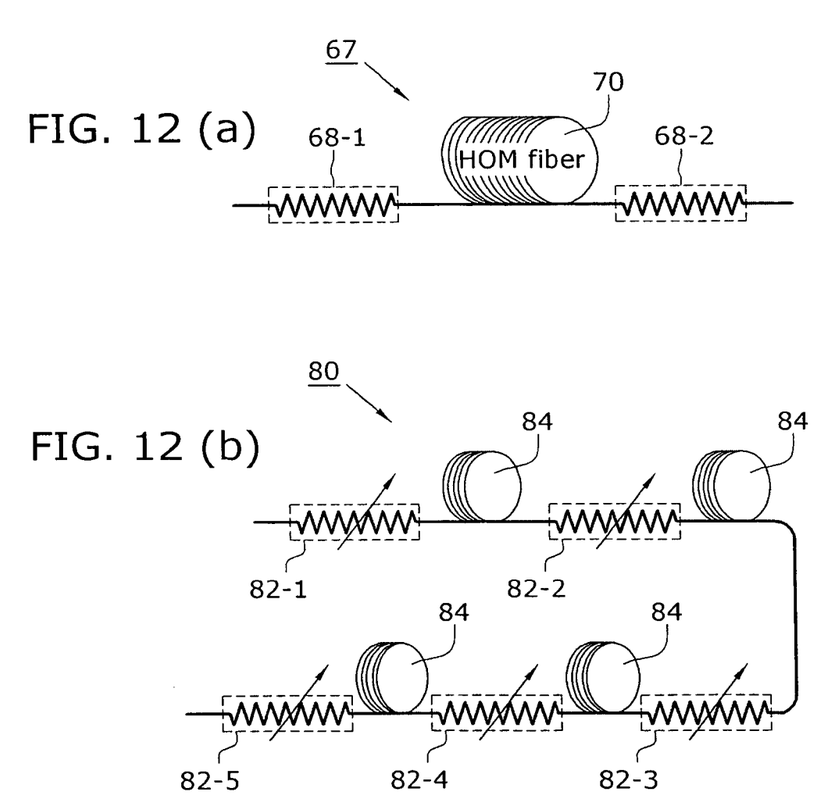

The microbend-induced fiber gratings of the present invention may be used as either static or dynamic mode converters, which are key elements in building dispersion compensators and delay lines that operate in a higher order mode of a fiber. FIG. 12 illustrates this concept, where FIG. 12(a) illustrates a static dispersion compensator 67 that comprises a first MIG 68-1 at the input of a higher order mode (HOM) fiber 70 and a second MIG 68-2 at the output of HOM fiber 70. A tunable dispersion compensator 80 is illustrated in FIG. 12(b), where a plurality of tunable MIGs 82-1, 82-2, . . . are disposed in series, with differing lengths of HOM fiber 84 disposed therebetween.

Various other devices, subsystems and systems, as well as various other particular fiber designs, are considered to fall within the spirit and scope of the present invention as directed to a polarization-insensitive microbend-induced fiber grating. All deviations from the specific teachings as contained within the specification that rely on the inventive principles and their equivalents through which the art has been advanced are properly considered to fall within the scope of the present invention as defined by the claims appended hereto.

What is claimed is:

1. An optical fiber configured to support polarization insensitive operation by supporting propagation along the odd/even $HE_{2m}$ modes, the fiber core comprising
   a central core region of a selected refractive index ($\Delta n_c$) and a predefined radial extent ($r_c$);
   a trench core region surrounding the central core region, the trench core region having a selected refractive index ($\Delta n_t$) less than the central core region refractive index, said trench core region having a predefined radial extent ($r_t$); and
   a ring area surrounding the trench core region, the ring area having a selected refractive index ($\Delta n_r$) greater than the trench core region refractive index and a predefined radial extent ($r_r$), the refractive indices and radii of each element configured to provide a relatively large gradient in refractive index as a function of distance from the fiber core center, sufficient to provide a resonant mode splitting between the propagating $TE_{0m}$ and $TM_{0m}$ modes with respect to the polarization insensitive odd/even $HE_{2m}$ modes such that an insubstantial amount of signal is coupled into the TE and TM modes, where m defines the order of the radial mode for the wavelengths supported by the fiber.

2. An optical fiber as defined in claim 1 wherein the refractive index of the ring area is defined as a refractive index difference with respect to the refractive index of silica ($n_{silica}=0$) and the refractive index difference of the ring area is selected to be greater than 0.015.

3. An optical fiber as defined in claim 1 wherein the transition between the refractive index of the ring and the refractive index of the trench occurs over a relatively small radial extent.

4. An optical fiber as defined in claim 3 wherein the transition in refractive index occurs over an extent of less than one micron.

5. An optical fiber as defined in claim 1 wherein the refractive index of the central core region is defined as a refractive index difference with respect to the refractive index of silica ($n_{silica}=0$) and the refractive index different of the central core region is selected to be approximately seventy-five percent of the value of refractive index of the ring area.

6. An optical fiber as defined in claim 1 wherein the predefined radial extent of the central core region is large enough to support the propagation of the $LP_{01}$ mode without also supporting the propagation of higher-order $LP_{1m}$ modes.

* * * * *